(12) United States Patent
Borkiewicz et al.

(10) Patent No.: US 6,786,321 B2
(45) Date of Patent: Sep. 7, 2004

(54) INDEPENDENT CONVEYOR SYSTEM FOR CONVEYING LINKED FOOD PRODUCTS

(75) Inventors: Zbigniew S. Borkiewicz, Sun Prairie, WI (US); Timothy J. Drebing, Middleton, WI (US); Kris K. Hulett, Ashland, MI (US)

(73) Assignee: Kraft Foods Holdings, Inc., Northfield, IL (US)

( * ) Notice: Subject to any disclaimer, the term of this patent is extended or adjusted under 35 U.S.C. 154(b) by 0 days.

(21) Appl. No.: 10/286,386

(22) Filed: Nov. 1, 2002

(65) Prior Publication Data

US 2004/0084283 A1 May 6, 2004

(51) Int. Cl.[7] .............................................. B65G 47/26
(52) U.S. Cl. .............................. 198/419.3; 198/676.1; 452/183
(58) Field of Search ........................ 452/51, 183, 182; 226/104–107; 198/419.3, 468.1, 678.1, 681

(56) References Cited

U.S. PATENT DOCUMENTS

| | | | |
|---|---|---|---|
| 233,698 A | 10/1880 | Rankin | |
| 1,778,484 A | 10/1930 | Da Costa | |
| 1,780,224 A | 11/1930 | Da Costa | |
| 1,973,196 A | 9/1934 | Baker | |
| 2,212,348 A | 8/1940 | Ludington | |
| 2,551,080 A | 5/1951 | Allen et al. | |
| 2,609,083 A | 9/1952 | Leach | |
| 2,725,970 A | 12/1955 | Wullschleger | |
| 3,032,172 A | 5/1962 | Jensen | |
| 3,132,373 A | 5/1964 | Altenpohl | |
| 3,191,222 A | 6/1965 | Townsend | |
| 3,204,844 A | 9/1965 | Wallace | |
| 3,264,679 A | 8/1966 | Moekle | |
| 3,296,657 A | 1/1967 | Moekle | |
| 3,430,831 A | * 3/1969 | Burton et al. | ................ 226/105 |
| 3,494,277 A | 2/1970 | Olson | |
| 3,511,370 A | 5/1970 | Taylor | |
| 3,533,495 A | 10/1970 | Wallace | |
| 3,593,368 A | 7/1971 | Cox | |
| 3,790,685 A | 2/1974 | Criss et al. | |
| 3,850,566 A | 11/1974 | Moore | |
| 4,218,003 A | 8/1980 | Plewa et al. | |
| 4,317,258 A | 3/1982 | Altenpohl et al. | |
| 4,498,578 A | 2/1985 | Altenpohl | |
| 4,547,931 A | 10/1985 | Staudenrausch et al. | |
| 4,761,854 A | 8/1988 | Schnell et al. | |
| 4,880,105 A | * 11/1989 | Kasai et al. | .............. 198/465.4 |
| 5,073,142 A | 12/1991 | Kasai et al. | |
| 5,085,612 A | 2/1992 | Muller et al. | |
| 5,163,864 A | * 11/1992 | Burger et al. | .................. 452/51 |
| 5,174,428 A | 12/1992 | Durst | |
| 5,183,433 A | 2/1993 | Townsend et al. | |

(List continued on next page.)

Primary Examiner—Richard Ridley
(74) Attorney, Agent, or Firm—Fitch, Even, Tabin & Flannery

(57) ABSTRACT

A system and methods for conveying linked chains of food product in a production cycle. In one implementation, a system comprises a first and second conveyors each traveling from a loading station proximate a linker to an unloading station and back, each conveyor having link support members for receiving linked chains discharged from the linker and conveying them to the unloading station. Preferably, the conveyors are independently driven such that while the link support members of one conveyor are at the loading station, the link supports members of the other conveyor are conveyed to the unloading station and/or are unloaded at the unloading station. Thus, the receiving of one linked chain at a conveyor is not affected by interruptions in movement of the other conveyor. Similarly, the unloading of one linked chain is not affected by interruptions in movement of the other conveyor.

23 Claims, 10 Drawing Sheets

U.S. PATENT DOCUMENTS

| | | |
|---|---|---|
| 5,197,915 A | 3/1993 | Nakamura et al. |
| 5,232,080 A | 8/1993 | van Essen et al. |
| 5,244,683 A | 9/1993 | Schreiber et al. |
| 5,354,229 A | 10/1994 | Markwardt et al. |
| 5,354,230 A | 10/1994 | McFarlane et al. |
| 5,672,099 A | 9/1997 | Takamagari et al. |
| 5,730,649 A | 3/1998 | Schliesser et al. |
| 5,896,809 A | 4/1999 | Miller |
| 5,971,842 A | 10/1999 | Simpson et al. |
| 5,993,307 A | 11/1999 | Hamblin |
| 6,019,213 A * | 2/2000 | Schubert .................. 198/419.3 |
| 6,056,636 A | 5/2000 | Cody et al. |
| 6,071,186 A | 6/2000 | Shibata et al. |
| 6,083,093 A | 7/2000 | Williams |
| 6,086,469 A | 7/2000 | Cody et al. |
| 6,125,991 A | 10/2000 | Veldkamp et al. |
| 6,213,368 B1 * | 4/2001 | Vermeer et al. ............ 226/104 |
| 6,277,018 B1 * | 8/2001 | Cody et al. .................... 452/51 |
| 6,290,591 B1 * | 9/2001 | Hergott et al. ................ 452/51 |
| 6,572,465 B2 * | 6/2003 | Kimura ....................... 452/51 |

\* cited by examiner

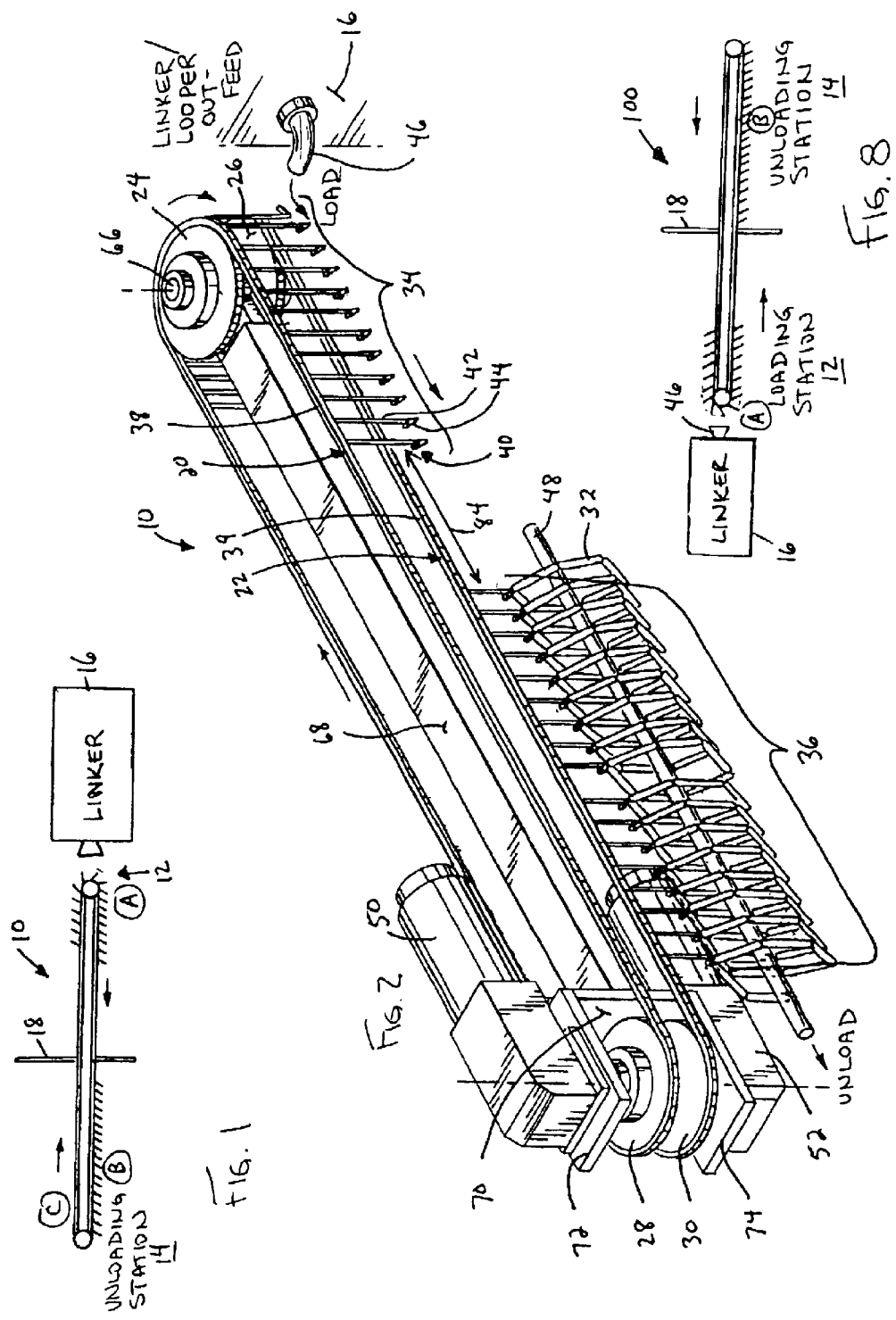

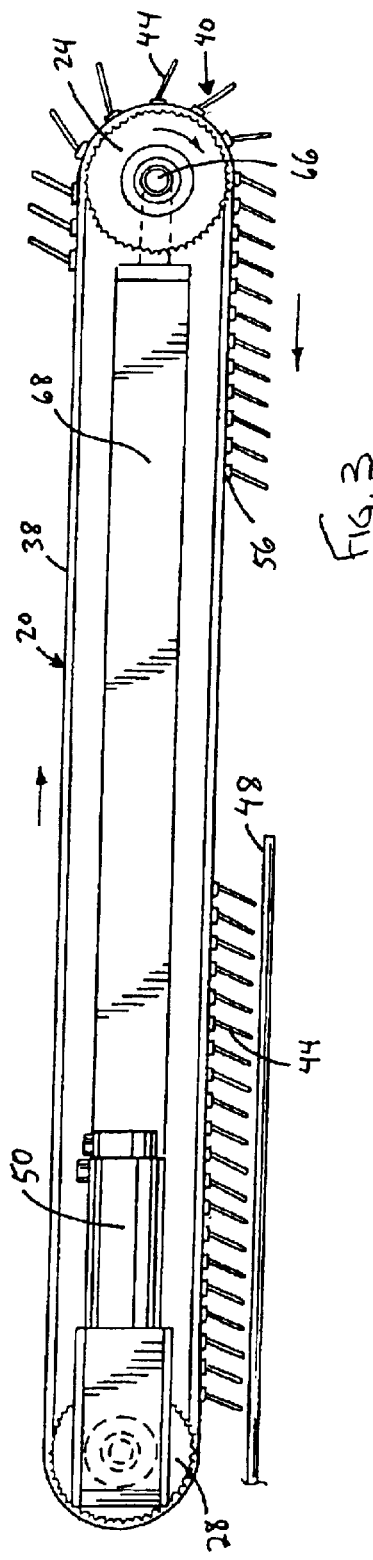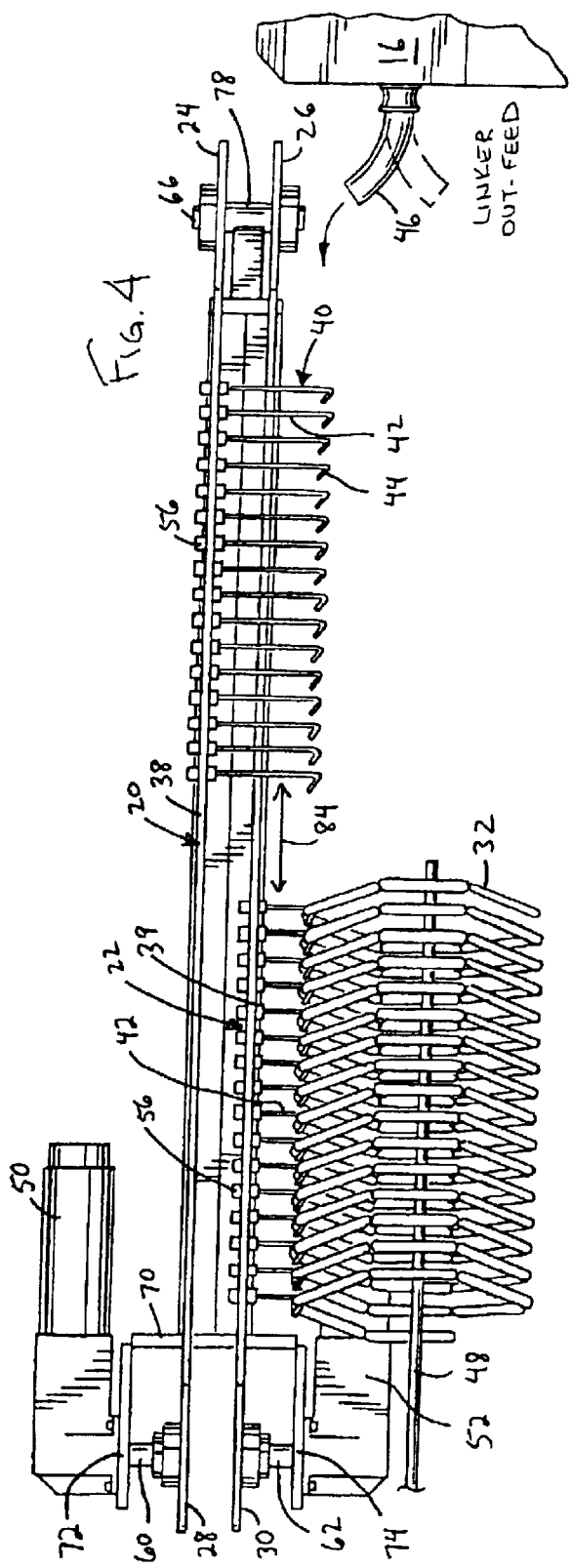

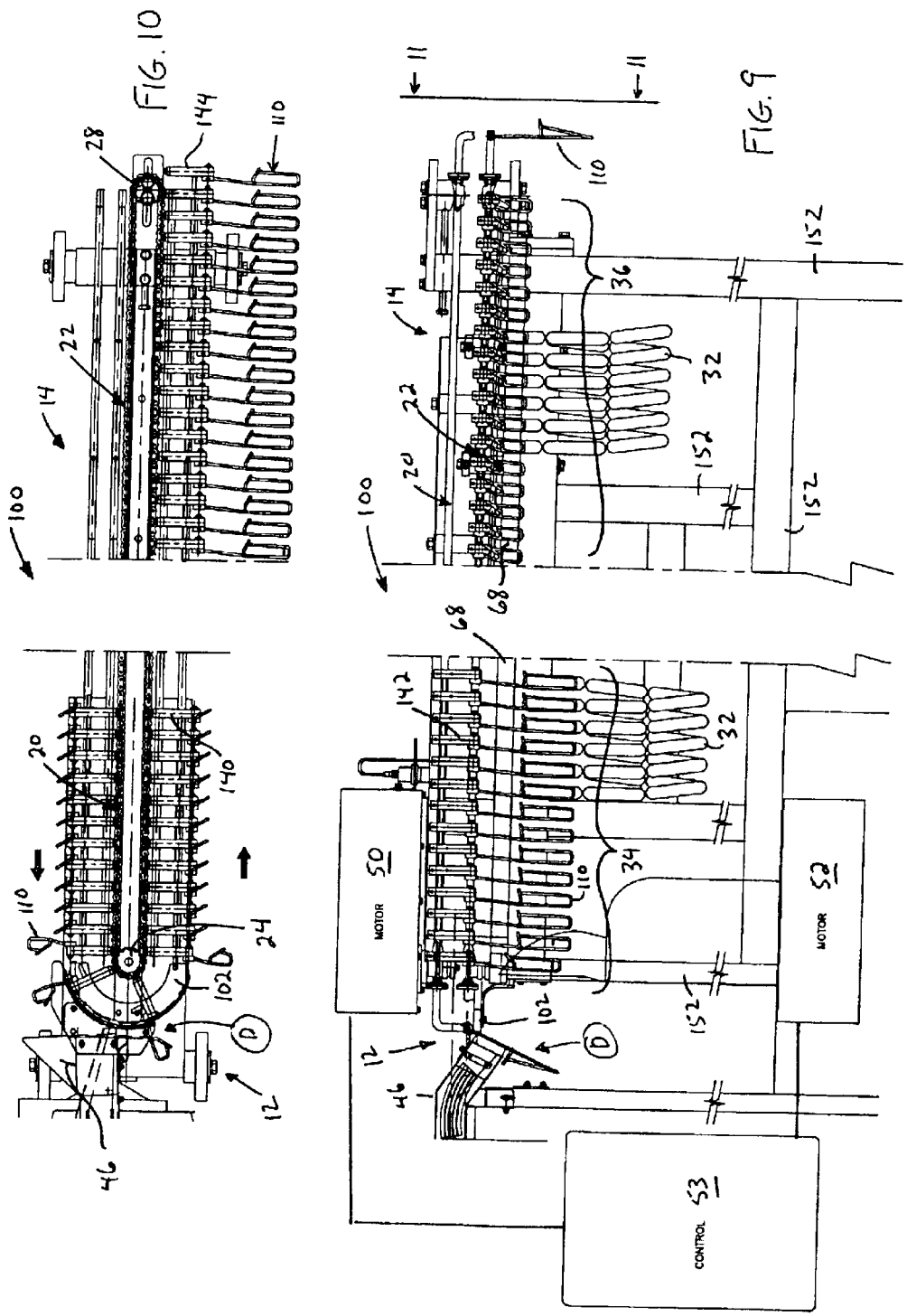

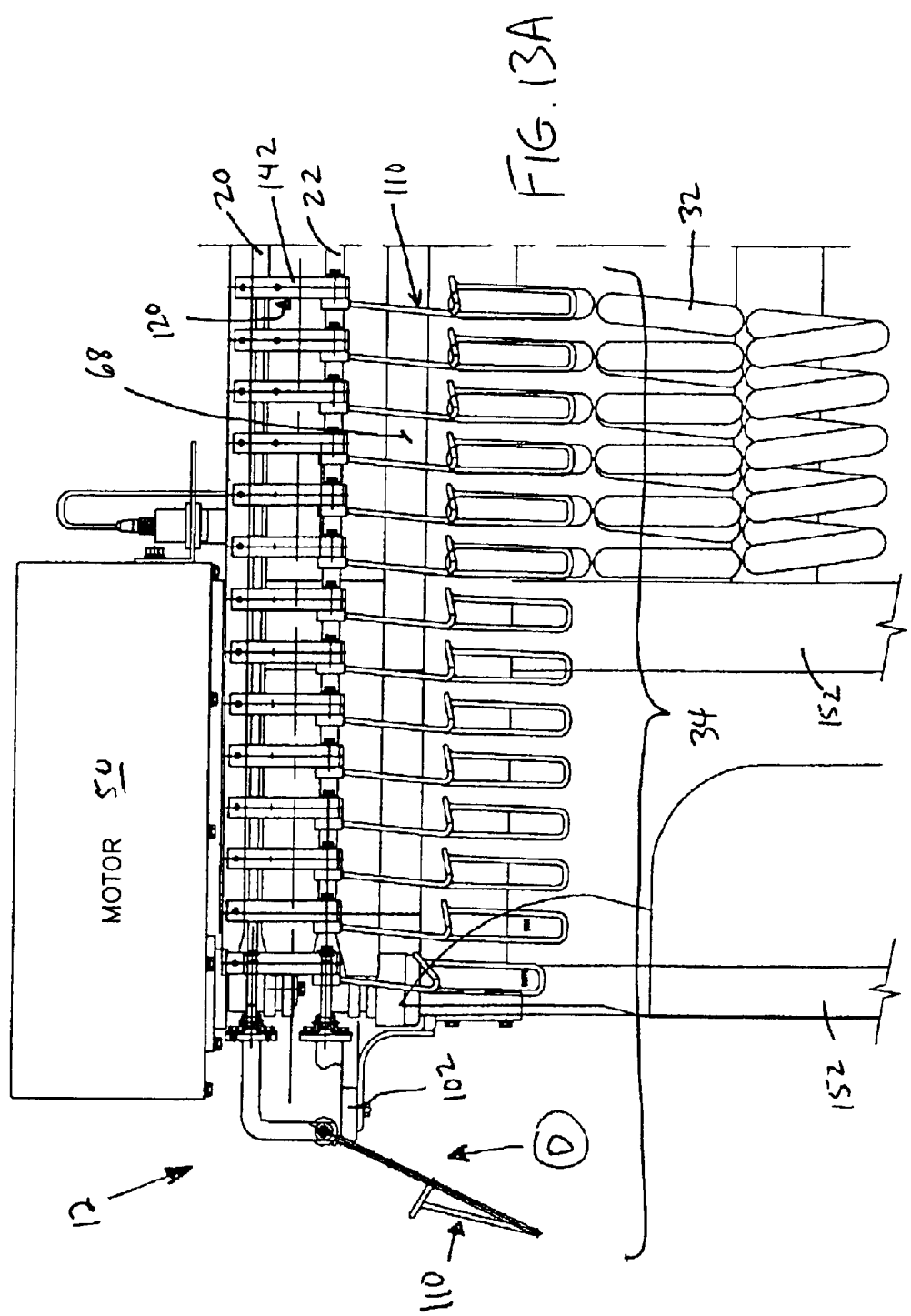

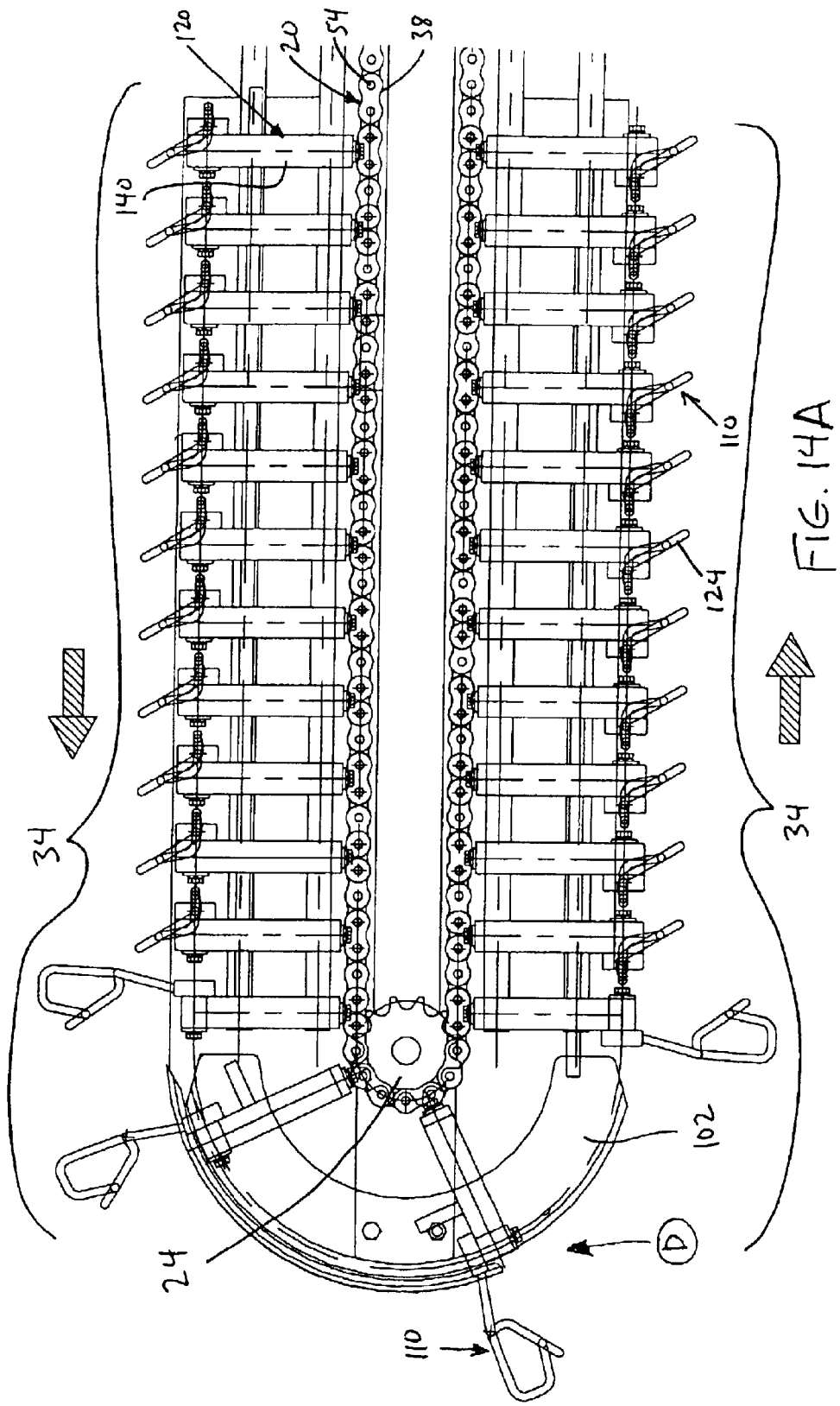

INDEPENDENT CONVEYOR SYSTEM FOR CONVEYING LINKED FOOD PRODUCTS

BACKGROUND OF THE INVENTION

1. Field of the Invention

The present invention relates generally to the production of linked food products, and more specifically to conveyor equipment for conveying linked food products, such as hot dogs or sausages, output from a linker that makes the linked food product.

2. Discussion of the Related Art

In the production of linked food products, such as hot dogs or sausages, it is well known to utilize conveyors to convey the food product to different points in the production process. Typically, a conventional sausage making machine or "linker" makes linked sausage or hot dog chains. For example, the linker pumps a filling comprising, e.g., meat or other proteinaceous food products, along with flavorings and other ingredients into an elongated casing, which is pinched and/or twisted at regular intervals to form individual links and then delivered through a horn.

At a loading station, hooks suspended from a moving conveyor chain are positioned to receive the links output from the horn. Once loaded, the links are carried by the conveyor to another location. The links are removed from the conveyor at an unloading station. In a typical conveyor, any conveyor stoppages at the unloading station to unload a given sausage chain also stops the conveyor at the loading station. Thus, the operation of the linker is stopped. For example, the linker would have to stop outputting a sausage chain temporarily or produce a sausage chain during periods of continuous conveyor movement. Again, even though delays resulting from conveyor stoppages at the unloading station are short, they result in a great inefficiency at the linker over time. Therefore, it is desired to minimize stoppage times at the unloading station.

Additionally, at the conventional linker, once a particular elongated casing is filled and output to the conveyor, the loaded chain is "tied off" at its ends to prevent filling from leaking out of the end of the casing. Movement of the conveyor is typically stopped to tie off the casing, which may take an operator several seconds. During interruption of the conveyor movement, the loaded sausage chain is delayed from being conveyed to other portions of the production cycle. With sausage making machines that can fill a 140-foot casing in about 25 seconds, this stoppage occurs frequently and results in inefficiency in the conveyor output.

Accordingly, there is a need for a conveyor system that will more efficiently load, convey and unload linked food products.

SUMMARY OF THE INVENTION

The invention provides a conveyor system for efficiently transporting or conveying a chain of linked food products, such as hot dogs or sausages. The linked chain is received onto a set of link supports of a conveyor at a loading station. The linked chain is then transported to an unloading station where it is unloaded from the set of link supports.

In preferred form, the conveyor system includes two or more independently driven conveyors, each configured to load linked chains of food product from a linker at a shared loading station and transport the linked chains to a shared unloading station to be removed.

The preferred independently driven and coordinated conveyors allow for independent operation of the loading and unloading processes at the loading station and the unloading station. For example, according to one embodiment, while one linked chain is being loaded onto a given conveyor at the loading station, another chain is unloaded from the other conveyor at the unloading station. Thus, in a broad sense, the loading operation of a given conveyor is not limited or affected by interruptions in movement of the other conveyor, e.g., interruptions in conveyor movement during unloading. Similarly, the unloading operation of a given conveyor is not limited or affected by interruptions in movement of the other conveyor, e.g., interruptions in conveyor movement during loading.

In preferred embodiments, since the linker can load the next linked chain on the other conveyor while a given linked chain is being unloaded (i.e., the linker does not have to wait during the unloading process), the operation of the linker is more continuous; and thus, more efficient. Additionally, since the linker does not have to wait for the unloading process, the allowable time for the unloading process is increased without an increase in the production cycle time. In other words, in one embodiment, the time of chain unloading is eliminated from the production cycle, increasing the linker machine efficiency. Thus, in this embodiment, the time to unload a given linked chain from a given conveyor can be made up to approximately equal to the time to load a given chain onto another conveyor. Since the allowable time for unloading is increased, the unloading process can be automated, as in preferred embodiments. However, it is understood that the unloading process may also be manually performed by an operator. It is also understood that even though the unloading time may be increased, in many embodiments, the unloading time is still minimized for further increases in linker efficiency. In these embodiments, it is desired to minimize the time taken to transfer and unload a given linked chain. In preferred embodiments, by eliminating the unloading time from the production cycle, approximately a 10–35% increase in production output of the conveyor system is realized without an increase in labor costs in comparison to a single conveyor system.

Additionally, the independently driven conveyors are coordinated such that the sets of link support members of the conveyors are separated by a desired gap in order to ensure that the sets of link support members do not collide with each other. In one embodiment, such a gap or separation is provided such that while one conveyor is loading, another conveyor is unloading. However, in some embodiments, it is desired to minimize the gap between sets of link support members, especially at the beginning of the loading station. This allows for the linker to operate more continuously since it does not have to wait for a previously loaded linked chain to be unloaded at an unloading station and the set of link support members to return to a loading position, e.g., the linker may create and load the next linked chain shortly after the previously loaded linked chain has left the loading station.

In preferred embodiments, the gap between sets of link support members is variable at different points of the conveyor path, such that as soon as possible after a linked chain has been loaded at the loading station, the next set of link support members is in position at the loading station to load the next linked chain. In these embodiments, the time to convey a given linked chain to the unloading station, unload the linked chain and then convey the set of link support members back into position to receive the next linked chain at the loading station is set to be no more than the time it takes to load a given linked chain onto a given set of link support members. This will ensure that a set of link support members is in position to receive the next linked chain from the linker as soon as the linker is able to produce another linked chain; therefore, providing near continuous linker operation. However, the gap must still be maintained such that the unloaded set of link support members does not collide with a set of link support members being loaded at the linker, i.e., the set of link support members approaching the loading station after unloading may have to be stopped as it approaches the loading station to avoid a collision. Again, since the loading process on a given conveyor is not affected by interruptions in movement of the other conveyor (e.g., due to unloading or maintaining a gap), the linker operation is not interrupted while producing a linked chain and another set of link support members is in position to receive the next linked chain to be output from the linker. Thus, preferably, the linker operates near continuously while independently of the other processes occurring on the conveyor path (e.g., conveying, unloading) providing for improved efficiency.

In one embodiment, the invention can be characterized as a system for conveying chains of linked food products comprising: a first conveyor having a first path of motion from a loading station proximate a linker to an unloading station and back to the loading station; a first set of link support members coupled to the first conveyor for receiving a first chain of linked food product discharged from the linker at the loading station and conveying the first chain to the unloading station; a second conveyor having a second path of motion from the loading station to the unloading station and back to the loading station; and a second set of link support members coupled to the second conveyor for receiving a second chain of linked food product discharged from the linker at the loading station and conveying the second chain to the unloading station; wherein the loading station and the unloading station are shared between the first conveyor and the second conveyor; and wherein the receiving the second chain at the second set of link support members is not affected by an interruption in movement of the first conveyor.

In another embodiment, the invention can be characterized as a system for conveying chains of linked food products comprising: a first conveyor having a first path of motion from a loading station proximate a linker to an unloading station and back to the loading station; a first set of link support members coupled to the first conveyor for receiving a first chain of linked food product discharged from the linker at the loading station and conveying the first chain to the unloading station, the unloading station for unloading the first chain from the first set of link support members; a second conveyor having a second path of motion from the loading station to the unloading station and back to the loading station; and a second set of link support members coupled to the second conveyor for receiving a second chain of linked food product discharged from the linker at the loading station and conveying the second chain to the unloading station, the unloading station for unloading the second chain from the second set of link support members; wherein the loading station and the unloading station are shared between the first conveyor and the second conveyor; and wherein the unloading the first chain from the first set of link support members is not affected by an interruption in movement of the second conveyor.

In a further embodiment, the invention may be characterized as a method of conveying chains of linked food products comprising the steps: receiving a first chain of linked food product discharged from a linker at a loading station onto a first set of link support members of a first moving conveyor such that the first chain is suspended from the first set of link support members; conveying the first chain to an unloading station with the first moving conveyor; unloading the first chain from the first set of link support members of the first moving conveyor at an unloading station; and receiving a second chain of linked food product discharged from the linker at a loading station onto a second set of link support members of a second moving conveyor such that the second chain is suspended from the second set of link support members; wherein the loading station and the unloading station are shared between the first moving conveyor and the second moving conveyor; and wherein the receiving the second chain is not affected by an interruption in movement of the second moving conveyor In yet another embodiment, the invention may be characterized as a method of conveying chains of linked food products comprising the steps: receiving a first chain of linked food product discharged from a linker at a loading station onto a first set of link support members of a first moving conveyor such that the first chain is suspended from the first set of link support members; conveying the first chain to an unloading station with the first moving conveyor; unloading the first chain from the first set of link support members of the first moving conveyor at an unloading station; and receiving a second chain of linked food product discharged from the linker at a loading station onto a second set of link support members of a second moving conveyor such that the second chain is suspended from the second set of link support members; conveying the second chain to the unloading station with the second moving conveyor; wherein the loading station and the unloading station are shared between the first moving conveyor and the second moving conveyor; and wherein the unloading the first chain from the first set of link support members step is not affected by an interruption in movement of the second conveyor.

BRIEF DESCRIPTION OF THE DRAWINGS

The above and other aspects, features and advantages of the present invention will be more apparent from the following more particular description thereof, presented in conjunction with the following drawings.

FIG. 1 is a schematic plan view of a conveyor system having a loading station for loading linked food products output from a linker and conveying the linked food product to an unloading station for removal in accordance with the present invention.

FIG. 2 is a perspective view of a conveyor system including two independently driven but coordinated conveyors for transporting linked food products from the linker to the unloading station in accordance with the present invention.

FIG. 3 is a plan view of the conveyor system of FIG. 2 illustrating an upper conveyor and link support members of both the upper conveyor and a lower conveyor.

FIG. 4 is a side elevational view of the conveyor system of FIG. 2 illustrating the upper and lower conveyors and corresponding link support members.

FIG. 8 is a schematic plan view of another conveyor system in accordance with the present invention.

FIG. 9 is a side elevational view of the conveyor system of FIG. 8 illustrating preferred link support members and the orientation thereof during the loading and unloading of the linked food product chain.

FIG. 10 is a plan view of the conveyor system of FIG. 9 illustrating the orientation of the link support members during the loading and unloading of the linked food product chain.

FIGS. 13A and 13B are enlarged side elevational views of the conveyor system of FIG. 9 illustrating a loading end and an unloading end, respectively, of the conveyor system.

FIGS. 14A and 14B are enlarged plan views of the conveyor system of FIG. 10 illustrating the loading end and the unloading end, respectively, of the conveyor system.

Corresponding reference characters indicate corresponding components throughout the several views of the drawings.

DETAILED DESCRIPTION

Figure 5:
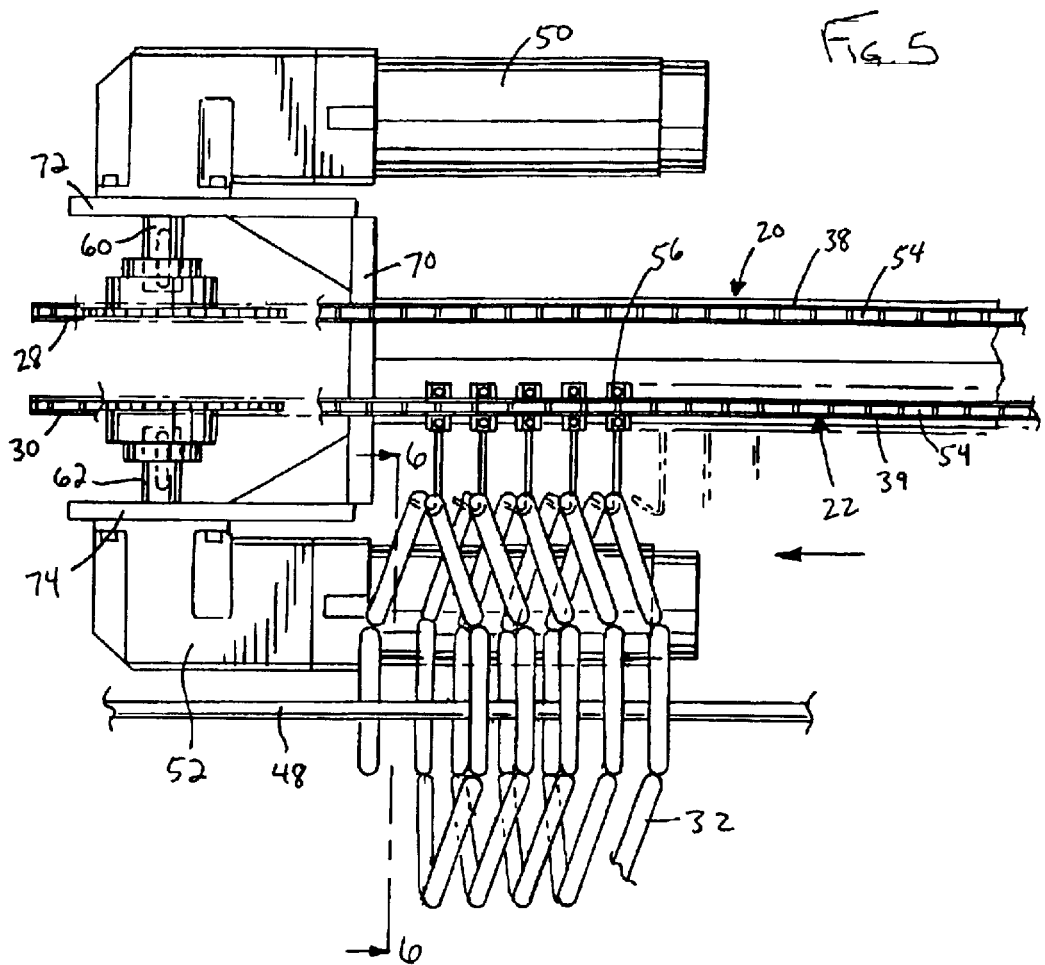
FIG. 5 is an enlarged side elevational view of an unloading end of the conveyor system of FIG. 2.
Figure 6:
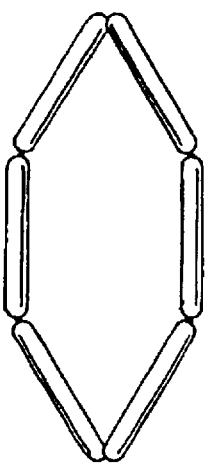
FIG. 6 is a view taken along line 6—6 of FIG. 5 illustrating a loop of linked food product held by a single link support member having six links.
Figure 7:
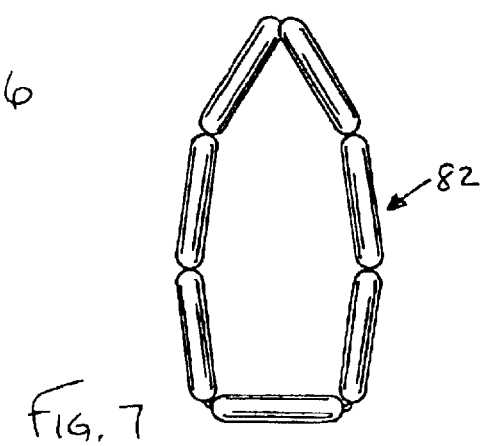
FIG. 7 is a view of an alternative loop of linked food product in which a single link support member holds seven links.

The following description is not to be taken in a limiting sense, but is made merely for the purpose of describing the general principles of preferred embodiments. The scope of the invention should be determined with reference to the claims.

The invention is generally directed to conveyor systems for efficiently transporting or conveying an elongated chain of linked food product, such as hot dogs or sausages, through at least a portion of a production line. For example, while generally referring to FIGS. 1 and 2, a chain of linked food product (also referred to as a linked chain 32) is received onto a set of link support members of a conveyor at a loading station 12 as the linked chain is output from a conventional linker machine 16. The linked chain 32 is then transported a distance to an unloading station 14 where it is unloaded from the set of link support members and further processed before final delivery to the consumer. In preferred form, the invention provides a conveyor system 10 having two or more independently driven conveyors, each configured to load linked chains 32 of food product from the linker 16 at a shared loading station and transport the linked chains to a shared unloading station to be removed. The two conveyors 20, 22 are independently driven but coordinated such that preferably while one conveyor 20 is loading a linked chain of food product, the other conveyor 22 transports a previously loaded linked chain to the unloading station 14 and/or unloads a previously loaded and conveyed linked chain of food product and/or is transported into position to load the next linked chain.

The preferred independent conveyors 20, 22 allow for independent operation of the loading and unloading processes at the loading station 12 and the unloading station 14. For example, while one linked chain is being loaded onto a given conveyor at the loading station 12, another previously loaded chain on another conveyor is being transported to the unloading station 14 and/or is waiting on the other conveyor in a stationary position for unloading at the unloading station 14 and/or is unloaded from the unloading station 14 and/or the unloaded set of link support members is being transported back to the loading station. Thus, in a broad sense, the loading operation of a given conveyor is not limited or affected by interruptions in movement of the other conveyor, e.g., interruptions in conveyor movement during unloading. Similarly, the unloading operation of a given conveyor is not limited or affected by interruptions in movement of the other conveyor, e.g., interruptions in conveyor movement during loading.

In preferred embodiments, since the linker can load the next linked chain on the other conveyor while a given linked chain is being conveyed and/or unloaded (i.e., the linker does not have to wait during the unloading process), the operation of the linker is more continuous. Near-continuous operation of linker is desired such that more linked chains of food product may be produced during a given time frame. Thus, the more continuously operating the linker is, the linker is more efficient.

Since the linker 16 can load the next chain on the other conveyor during conveying the given chain to the unloading station and/or during unloading of the given chain at the unloading station (i.e., the linker does not have to wait during conveyor interruptions at the unloading process and does not have to wait for the loaded chain to be unloaded and then return back to the loading station), the operation of the linker is made more continuous, and thus, more efficient.

Furthermore, since the linker does not have to wait for the unloading process, in some embodiments, the allowable time for the unloading process is increased without an increase in the production cycle time. In other words, this eliminates the time of chain unloading from the production cycle, increasing the linker machine efficiency. Thus, the time to unload a given linked chain from a given conveyor can be made up to approximately equal to the time to load a given chain onto another conveyor. Since the allowable time for unloading is increased, the unloading process can be automated, as in preferred embodiments. It is also understood that even though the unloading time may be increased, in many embodiments, the unloading time is still minimized for further increases in linker efficiency. In preferred embodiments, by allowing the linker to operate more continuously and by eliminating the unloading time from the production cycle, approximately a 10–35% increase in production output of the conveyor system 10 may be realized without an increase in labor costs in comparison to a single conveyor system.

Additionally, the independently driven conveyors are coordinated such that the sets 34, 36 of link support members of the conveyors 20, 22 are separated by a desired gap 84 in order to ensure that the sets of link support members do not collide with each other in their paths of movement from the loading station 12 to the unloading station 14 and back. In one embodiment, such a gap or separation is provided such that while one conveyor is loading, another conveyor is unloading. However, in some embodiments, it is desired to minimize the gap 84 between sets 34, 36 of link support members, particularly, the gap between the end of a set of link support members being loaded and the beginning of the next set of link support members ready for loading. This allows for the linker 16 to operate more continuously since it does not have to wait for a previously loaded linked chain to be conveyed to an unloading station, e.g., the linker may create and load the next linked chain 32 shortly after the previously loaded linked chain has left the loading station 12.

In preferred embodiments, the gap at the loading station is minimized, such that the time duration of loading a given linked chain 32 onto a given set of link support members is at least as long as the time duration to convey a given linked chain 32 to the unloading station 14, unload the linked chain and then convey the set of link support members back into position to receive the next linked chain 32 at the loading station 12. This will ensure that a set of link support members is in position to receive the next linked chain from the linker 16 as soon as the linker 16 is able to produce another linked chain; therefore, providing near continuous linker operation.

The shared loading station 12 at position A and the shared unloading station 14 at position B are schematically illustrated in FIG. 1 at opposite ends of the conveyor system 10. A conventional hot dog or sausage making machine or linker 16 is located proximate to the loading station 12. It is noted that although the unloading station 14 is illustrated at position B in FIG. 1, (i.e., on the same side of the conveyor system 10, but at an opposite end), the unloading station 14 may be alternatively located at the position C (i.e., on an opposite side of the conveyor at the opposite end). Similarly, the loading station 12, which is illustrated near one end of the conveyor system 10, may be located at other positions about the conveyor path. In preferred form, barrier 18 separates portions of the conveyor system accessible to an operator. For example, an operator works at the loading station 12, but the barrier 18, for safety reasons, prevents the operator from working at the unloading station 14, wherein the unloading operation is automated. However, it is understood that the activities at both the loading station 12 and the unloading station 14 may be performed by an operator or be automated depending on the exact implementation, i.e., barrier 18 is not present in several embodiments. For example, preferably in automated unloading implementations, the barrier 18 is provided.

One specific configuration of a conveyor system 10 in accordance with the invention is illustrated in FIGS. 2–7 and described below. The conveyor system 10 includes two conveyors 20, 22 (also referred to as an upper conveyor 20 and a lower conveyor 22) whose movement is independent of each other and coordinated. Each respective conveyor 20, 22 includes a respective conveyor chain 38, 39 that travels about a respective sprocket 24, 26 at the loading station end of the conveyor system 10 and about a respective sprocket 28, 30 at an end of the conveyor near the unloading station 14. Conveyor frame 68 separates and extends between the loading end and the unloading end of the conveyor system 10. At the unloading end, the mounting bracket 70 rigidly attaches to one end of the conveyor frame 68. Drive motor 50, which operates the upper conveyor 20, is coupled to the sprocket 28 and rigidly held in position by an upper section 72 of the mounting bracket 70. Drive motor 52, which operates the lower conveyor 22, is coupled to the sprocket 30 and rigidly held in position by a lower section 74 of the mounting bracket 70. Drive shafts 60, 62 are coupled drive motors 50, 52, respectively, and rotate sprockets 28, 30, respectively, which causes motion of the conveyor chains 38, 39. Sprockets 24, 26 rotate about spindle 66. At the loading end, bracket 78 is rigidly attached to an opposite end of the frame 68 and retains spindle 66. Each conveyor chain 38, 39 is made up of connected chain links 54 (see FIG. 5).

Each conveyor 20, 22 is horizontally disposed and travels a similar fixed path from the loading station 12 to the unloading station 14 and back. However, the conveyors 20, 22 are vertically displaced at different elevations relative to each other. As illustrated, the upper conveyor 20 includes a conveyor chain 38 that travels about sprockets 24 and 28, while the lower conveyor 22 includes conveyor chain 39 that travels about sprockets 26 and 30. The path of movement of each conveyor is best illustrated in the plan view of FIG. 3. It should be understood that the exact path of the conveyor travel may be altered and remain in accordance with the invention. For example, the conveyor path may bend about another sprocket. Thus, the conveyor path may vary depending on the implementation.

Each conveyor 20, 22 further includes a respective set 34, 36 of link support members 40, although it is noted that more than one set of link support members may be coupled to each conveyor. Each set is used to carry or convey a respective linked chain 32 of food product from the loading station 12 a specified distance to the unloading station 14. For example, upper conveyor 20 includes set 34 of link support members 40, while lower conveyor 22 includes set 36 of link support members 40. In preferred form, each set 34, 36 of link support members occupies less than half of the length of the conveyor 20, 22. The exact number of link support members 40 included in a given set 34, 36 and the exact length of a given conveyor chain occupied by the set 34, 36 varies depending on the number of links to be held by each link support member 40 and the overall length of the linked chain 32 to be conveyed. Each link support member 40 is configured to hang or carry at least two links of the linked chain 32 in a loop-like fashion, preferably, six links in loop 80 (see FIG. 6) or seven links in loop 82 (see FIG. 7). It is understood that the number of links in a loop that are carried or supported by each link support member 40 varies depending on the implementation, for example, there may be more than 6 or 7 links in a given loop.

The link support members 40 are attached to or coupled to a respective conveyor chain 38, 39. The link support members 40 function to receive the linked chain to be suspended therefrom and to be carried to an unloading position. For example, a bracket 56 (see FIG. 5) couples the link support members 40 to the chain links 54 of the conveyor chain 38, 39. In the illustrated embodiment, each link support member 40 includes a downwardly extending section 42 and a holding portion 44 (also referred to as a holding portion) that extends upward, outward and forward (e.g., forward relative to a direction of conveyor movement). It is noted that in other embodiments, the holding portion 44 may extend upward and outward in a plane perpendicular to the direction of travel, or upward, outward and rearward. In the illustrated embodiment, the orientation of the holding portion 44 assists in the loading and unloading operations and is described further below. Additionally, the holding portion 44 may be shaped in such a manner that the linked chain 32 supported thereon is spread or held such that the loops of links are in an open position. This allows for an unloading stick to be easily inserted into the opened loop supported by the holding portions. For example, the holding portion may have a base portion that is wider than a top portion that opens the chain loop, e.g., the holding portion may have a pyramidal shaped cross section where the top portion separates two adjacent links and spreads them apart by contact through to the base portion. Such holding portions and their functionality of opening a loop hanging thereon are well known in the art.

In preferred form, the link support members 40 are pivotably attached or coupled at an upper end thereof to a respective conveyor 20, 22. For example, the downwardly extending section 42 of each link support member 40 is pivotably attached to the bracket 56, which is attached to the conveyor chain. This pivotal attachment allows the link support member 40 the pivot outwardly about the upper end of the downwardly extending section 42. The outward pivotal motion of the link support member assists in the loading and unloading process, and is described in more detail below with reference to FIGS. 9–14B.

The holding portion 44 functions to hold or carry a portion of a respective linked chain of links 32. As illustrated in FIGS. 2 and 4, the downwardly extending sections 42 of the link support members 40 on the lower conveyor 22 are shorter than the downwardly extending sections 42 of the link support members 40 of the upper conveyor 20 such that the holding portions 44 of both sets 34, 36 are at the same elevation. This is best illustrated in FIGS. 2 and 4. This allows for consistent operation at the shared loading station 12 and the shared unloading station 14; i.e., the loading and unloading stations do not have to account for differently elevated link support members 40.

It is noted that the elevation of the holding portions 44 may be different in alternative embodiments, wherein downwardly extending sections 42 of all link support members 40 are the same length such that the holding portions of the different sets 34, 36 are at different elevations with respect to each other.

At the loading station, the chain of food product links 32 is output from the linker 16 through a horn 46. The link support members 40 advance along the path of conveyor movement such that the link support members 40 support the chain 36 at regular intervals. The motion of the conveyor may be continuous or may be an indexed movement in which the conveyor advances incrementally. The horn 46 may be a stationary and positioned such that it crosses the path of the link support members 40. Alternatively, the horn 46 may be a rotating horn (as illustrated in FIGS. 2 and 4) such that the linked chain 32 is loaded by rotating the horn 46. The loading process is repeated while the conveyor moves until the entire casing has been filled and ejected from the linker 16 and the linked chain 32 is supported on a given set of link support members in a generally helical configuration. For example, as illustrated in FIGS. 2, 4 and 5, the linked chain 32 has been loaded onto set 36 of the lower conveyor 22.

The conveyor then moves the linked chain 32 immediately downstream a short distance to the unloading station 14. According to one embodiment, while one linked chain is being loaded at the loading station, another previously loaded linked chain is simultaneously being unloaded at the unloading station 14. Since in preferred form, the purpose of the conveyor system 10 is to efficiently convey the linked chain from a linker into position to be unloaded and then inserted into a separate processing oven, the distance from one end of the conveyor to an opposite end is typically about 10–15 feet, for example, about 12 feet. However, it is noted that in other embodiments, each conveyor 20, 22 may be configured to convey the linked chain through another processing station (such as a processing oven for cooking, smoking, etc.) in between the loading station 12 and the unloading station 14. The distance between the loading station 12 and the unloading station 14 may be increased depending on the dimensions and configuration of such a processing station.

At the unloading station, a stick 48 (e.g., as illustrated in FIG. 2), rod, bar or suitable holding structure is fed through the generally helical linked chain 32 in the unloading position B. Once the stick 48 is inserted into the looped linked chain 32, the given conveyor is stopped and the stick is lifted upwardly relative to the link support members 40 such that linked chain is lifted off of the set of link support members 40. The stick 48 is then transferred directly to a processing station, e.g., a processing oven to cook or smoke the food product, or transferred into position to be received into a processing station. The movement of the conveyor may be stopped to insert the stick 48 into the linked chain. The stick 48 may be manually inserted into the linked chain or in preferred form, automatically inserted into the linked chain 32 and removed. In some embodiments, rather than being inserted into the looped chain, the looped linked chain 32 moves about a stationary stick 48 as the conveyor advances. It is understood that many other unloading mechanisms may be provided to unload the linked chain.

In preferred embodiments as described below with reference to FIGS. 8–14B, each link support member 40 is specially designed such that upon an outward pivoting of the link support member 40, the loop of the linked chain 32 is "opened" to allow for easier stick insertion. Such outward pivoting motion may be accomplished through the use of a cam, bar or other mechanism that causes several of the link support members 40 of a given set, and preferably, the entire set of link support members to pivot outwardly relative to the conveyor.

Each conveyor 20, 22 is independently driven by motors 50, 52 while at the same time, the operation of the motors is coordinated to ensure that the sets 34, 36 of link support members do not collide or overlap each other. In one form, a separate master controller (see FIG. 9, for example) is coupled to both drive motors 50, 52 which coordinates the movement of one conveyor 20 relative to the other conveyor 22 to maintain a separation or gap 84 between sets 34, 36 of link support members. This gap 84 is illustrated in FIG. 4; however, it is noted that the illustration of FIG. 4, the gap 84 is not necessarily accurately reflected. Furthermore, in some embodiment, the gap 84 varies at different portions of the conveyor path depending on the process the respective conveyors perform. That is, in embodiments where the loading and unloading operations occur at generally the same time, the gap 84 is typically greater than that shown in FIG. 4. The gap 84 of FIG. 4 is indicated as such to better illustrate the different link support member lengths. In one form, gap 84 provides that while one set of link support members is at the loading station 12, the other set of link support members is at the unloading station 14.

In other embodiments, it is desired that the linker operate as continuously as possible. As such, the gap 84 is to be minimized to ensure that the sets 34, 36 of link support members 110 do not collide with each about the system. For example, the gap 84 is set such that as soon as possible after a loaded linked chain 32 has been loaded and left the loading station 12 towards the unloading station 14, the linker 16 produces the next linked chain which is loaded on another conveyor. Thus, the gap 84 is minimized at the loading station. Ideally, the linker would continuously output linked chains; however, any stoppage in a given conveyor would result in the collision of the link support members 110 unless the other conveyor is also stopped. Thus, the gap 84 is maintained to be minimal and to ensure that sets of the link support members do not collide. In these embodiments, depending on the length of the conveyor path and the length of the linked chains, additional sets of link support members may be coupled to each conveyor 20, 22 with a minimum gap 84 formed in between sets of link supports members to provide an adequate number of non-overlapping sets of link support members such that the linker may more continuously output and load linked chains 32.

In another form, rather than having a controller or automated control to coordinate operation of the multiple conveyors, the conveyors are simply monitored by an operator to maintain the separation or gap 84 between sets 34, 36. The operator may simply stop one conveyor to allow the other conveyor to advance relative to the other conveyor.

This independent but coordinated conveyor movement allows for independent operation of the loading and unloading processes at the loading station 12 and the unloading station 14. That is, while one linked chain is being loaded onto a given conveyor at the loading station 12, another chain is advancing to the unloading station 14 and/or is waiting on the other conveyor in a stationary position for unloading at the unloading station 14 and/or is being unloaded from the unloading station 14 and/or is being conveyed back to the loading station 12. Thus, in a broad sense, the loading operation of a given conveyor is not limited or affected by interruptions in movement of the other conveyor, e.g., interruptions in conveyor movement during unloading or any other stoppages of the conveyor. Similarly, while one linked chain is being unloaded from a given conveyor at the unloading station 14, another chain is advancing toward the unloading station 14 and/or being loaded onto the other conveyor at the loading station 12 and/or is stopped to "tie off" the casing, for example. Thus, the unloading operation of a given conveyor is not limited or affected by interruptions in movement of the other conveyor, e.g., interruptions in conveyor movement during loading or any other stoppages of the conveyor.

In some embodiments, since the linker 16 does not have to wait during a stoppage in the conveyor chain of a previously loaded linked chain and since the linker does not have to wait for a loaded linked chain to be unloaded and then return back to the loading station 12 to load the next linked chain (because the linker 16 can load the next chain on the other conveyor during the conveying and/or unloading), the allowable time for the unloading process is increased without an increase in the production cycle time. That is, from the point of view of the linker 16, the linker does not have to wait for a given chain to be unloaded and conveyed back to the linker 16 to begin discharging the next linked chain for loading, the linker 16 only has to wait until the next set of link support members on the other conveyor is in position for loading. Ideally, another set of link support members 40 is in position to receive the next chain once the previously loaded chain departs the loading station 12. In some embodiments, the linker waits until the previously loaded linked chain is at the beginning of unloading a linked chain. Thus, from the linker's perspective, this eliminates the time for unloading from the production cycle, increasing the linker machine efficiency. Thus, in some embodiments, the time to unload a given linked chain from a given conveyor can be increased up to the time to load a given chain onto a given conveyor. Since the allowable time for unloading is increased, the unloading process can be automated, as in preferred embodiments.

Furthermore, any interruption in conveyor movement due to the unloading process and/or the conveying process does not result in the interruption of conveyor movement at the loading station. In contrast, if a single conveyor were used, a stoppage (even if for only a few seconds) to unload a loaded and conveyed linked chain would result in the entire conveyor stopping; thus, stopping a loading process on another set of link supports on the same conveyor from being simultaneously performed. Advantageously, since the set 34 of link support members being loaded at the loading station 12 is on another independently driven conveyor 20 than the set 36 on conveyor 22 being unloaded, the loading operation is not hindered by the unloading process and/or the conveying process. Thus, the linker 16 may operate more continuously, i.e., the linker 16 is not required to stop during the middle of creating a linked chain. Additionally, the interval in between loading is reduced in comparison to a single conveyor system since the linker can being loading the next linked chain shortly after the previously loaded linked chain leaves the loading station. That is, the linker 16 only has to wait until the next set 36 of link support members 40 is positioned at the loading station 12, which ideally occurs as soon as possible after the previously loaded linked chain departs the loading station. Alternatively, a set of link support members may be waiting at the loading station to be loaded until the previously loaded linked chains is conveyed a minimum distance from the loading station, then the loading operation and conveyor movement is resumed. Thus, the invention results in improved efficiency at the linker 16. In preferred form, this results in approximately a 10–35% increase in system production output in comparison to that of a single conveyor system without an increase in labor costs.

Furthermore, efficiency at the unloading station 14 is improved since the unloading process is independent of the loading and/or conveying processes. That is, any stoppages of conveyor movement at the loading station 12 and/or in conveying loaded linked chains to the unloading station 14 do not result in an interruption of conveyor movement at the unloading station 14. For example, an operator may have to stop movement of a given conveyor 20, 22 at the loading station 12 in order to "tie off" the end of the casing of the linked chain 32. It is noted that a very experienced operator may be able to tie off the casing while the loaded and linked chain 32 is being conveyed toward the unloading station. Although such an interruption in conveyor movement may only last a few seconds, in a single conveyor system, this stoppage would limit the movement of the conveyor at the unloading station, possibly limiting the conveyor operation if conveyor movement is needed at the unloading station. On the other hand, according to several embodiments of the invention, the operator may stop the movement of the conveyor 20 at or proximate to the loading station to tie off the casing independent of the movement of the conveyor 22 at the unloading station 14. Again, such delays although short would result in an inefficiency over time.

As stated above, in order to coordinate the independently driven conveyors, the operation of the drive motors 50, 52 may be controlled by a separate controller (see controller 53 of FIG. 9, for example) coupled to both motors 50, 52. The operation of the conveyors 20, 22 is independent but should be coordinated in some way in order to ensure that the sets 34, 36 of link support members do not collide with each other. That is, there should be a distance or gap 84 maintained between the sets 34, 36 of link support members. In one embodiment, when one conveyor is loading, the other conveyor is conveying a previously loaded linked chain toward the unloading station 14 and/or is unloading the previously loaded linked chain and/or conveying an unloaded set of link support members back to the loading station 12. As described above, in some embodiments, it is desired that the separation or gap 84 between sets of the link support members be minimized to ensure as near to continuous operation of the linker 16 while at the same time providing enough gap 84 to avoid overlapping or colliding successive sets 34, 36 of link support members 110. Thus, the gap 84 should not allow a moving conveyor to catch up with a stopped conveyor.

In preferred embodiments, the gap 84 between sets of link support members 34, 36 is variable at different points of the conveyor path, such that as soon as possible after a linked chain 32 has been loaded onto a given set 36 of link support members at the loading station 12, the next set 34 of link support members is in position at the loading station 12 to load the next linked chain. In these embodiments, the time to convey a given linked chain to the unloading station 14, unload the linked chain and then convey the set of link support members back into position to receive the next linked chain at the loading station 12 is set to be no more than the time it takes to load a given linked chain 32 onto a given set of link support members. This will ensure that a set of link support members is in position to receive the next linked chain from the linker 16 as soon as the linker 16 is able to produce another linked chain; therefore, providing near continuous linker operation. However, the gap 84 must still be maintained such that the unloaded set of link support members does not collide with a set of link support members being loaded at the linker 16, i.e., the set of link support members approaching the loading station 12 after unloading may have to be stopped as it approaches the loading station 12 to avoid a collision. Again, since the loading process on a given conveyor is not affected by interruptions in movement of the other conveyor (e.g., due to unloading or maintaining a gap 84), the linker operation is not interrupted while producing a linked chain and another set of link support members is in position to receive the next linked chain to be output from the linker 16. Thus, preferably, the linker 16 operates near continuously while independently of the other processes occurring on the conveyor path (e.g., conveying, unloading) providing for improved efficiency.

In one embodiment, one or more proximity switches are located at various locations about the conveyor movement path that detect the presence of the sets of the link support members and assist the controller 53 in maintaining the desired gap 84. For example, proximity switches may be located at one or more of the beginning and end of the loading and unloading stations, and/or at one or more locations in between the loading station and the unloading station, each proximity switch coupled to the controller 53. In preferred form, a single proximity switch is positioned at the beginning of the loading station. The one or more switches would detect the beginning and/or end of a particular set of link support members. Furthermore, the proximity switches may count the number of pitches or chain links 54 the conveyor chain has moved from a given position. Knowing the position of the beginning and/or the end of a given set of link support members, the controller 53, can send the appropriate control signals to the appropriate motor 50, 52 and to the linker 16. For example, knowing when a given set of link support members has left the loading station, the controller sends a loading control signal to another set of link support members on another conveyor waiting to be loaded such that after a predetermined number of conveyor chain links have passed the proximity switch (or after a specified time, the controller 53 knowing the velocity of the conveyor leaving the loading station 12), the loading control signal starting the movement of the other conveyor and the operation of the linker 16. Again, the loading operation is not interrupted by the conveying and/or unloading of the previously loaded linked chain. Such proximity switches and the use are well known in the art.

Alternatively, the drive motors 50, 52 are not coupled together at a controller; however, an operator prevents the sets of link support members on the conveyors from overlapping each other. The operator would be able to temporarily stop one conveyor and to allow a conveyor to move ahead in order to maintain a minimum separation, for example, by using controls on a control panel.

In one embodiment, a master controller is coupled to the drive motors 50, 52, the linker 16 and the automated structure that unloads the linked chain. The automated system sends a control signal to the linker 16 and the drive motors 50, 52 that it has unloaded a given linked chain, which allows the drive motors to properly control the respective conveyors 20, 22.

Next referring to FIGS. 8–14B, another embodiment of a conveyor system in accordance with the present invention is presented. As illustrated in FIG. 8, the linker 16 is located such that the horn 46 outputs the linked chain 32 at the end of the conveyor system 100 about sprocket 24. Note that in the conveyor system 100 of FIGS. 8–14B, the loading station 12 and unloading station 14 are at opposite ends as the conveyor system 10 of FIGS. 1–5. It is further noted that the unloading station 14 is illustrated at position B of the conveyor, although it may alternatively be located at position C.

Operation of the conveyor system 100 is described with reference to FIGS. 9–14B. The conveyor system 100 of FIGS. 8–14B operates similarly to the conveyor system 10 of FIGS. 1–7 in that the system includes the upper conveyor 20 and the lower conveyor 22 that are independently driven but coordinated in order to more efficiently load, convey and unload linked chains 32 of food product, which results in an increase in system production in comparison to single conveyor system as described above. However, the system 100 of FIGS. 8–11 illustrates a preferred design of a link support member 40 and further details of a preferred loading and unloading mechanism. The conveyor system 100 includes a support frame structure 152 for supporting conveyor frame 68. Additionally, each conveyor 20, 22 is likewise controlled by controller 53, which is coupled to independent drive motors 50, 52. The controller 53 includes control functionality (e.g., implemented in software) to coordinate the movement of the two conveyors. For example, the controller 53 controls the movement based upon inputs received from the linker 16, the drive motors 50, 52 and one or more proximity switches located at one or more desired locations of the system for detecting the position of the sets 34, 36 of link supports members. For example, as described above, the controller sends the appropriate control signals to start and stop each conveyor 20, 22 and to maintain a desired minimum separation 84 between consecutive sets of link support members (e.g., sets 34, 36) on different conveyors. The controller 53 may also send control signals to the linker to start and stop its operation. Similarly, the controller 53 may control the operation of an automated unloading process.

As illustrated in the left portions or loading ends of FIG. 9 (enlarged in FIG. 13A) and in FIG. 10 (enlarged in FIG. 14A), the loading station 12 (i.e., the loading end of the conveyor system 100) is positioned to receive a linked chain output from the horn 46, such that the product is loaded onto the link support members 110 of a set 34 of link support members. In order to present the link support member 110 to easily receive the linked chain, a loading cam 102 located at the loading station 12 mechanically engages each link support member 110 as it rounds the corner of the conveyor to pivot it laterally outward about its upper end with respect to the direction of movement of the conveyor (e.g., pivoted outward at an angle of about 25 degrees as illustrated at point D). Again, the linked chain is loaded as a series of connected loops about the set of link support members 110, each link support member 110 holding a specified number of links (e.g., loops 80 and 82 of FIGS. 6–7).

Once loaded, the upper conveyor 20 then conveys the linked chain 32 a specified distance to the unloading station 14 where the linked product is to be removed from the link support members 110. However, according to several embodiments of the invention, while the linked chain 32 is being loaded onto set 34, a previously loaded and conveyed linked chain is being conveyed to the unloading station 14 and/or being unloaded at the unloading station 14. In preferred form, for removal, mechanical engagement with an unloading member 104, e.g., a cam, bar or other mechanisms at the unloading station 14 causes the set 36 of link support members 110 (e.g., of conveyor 22) to pivot laterally outward about their upper ends with respect to the direction of movement of the conveyor.

Figure 11:
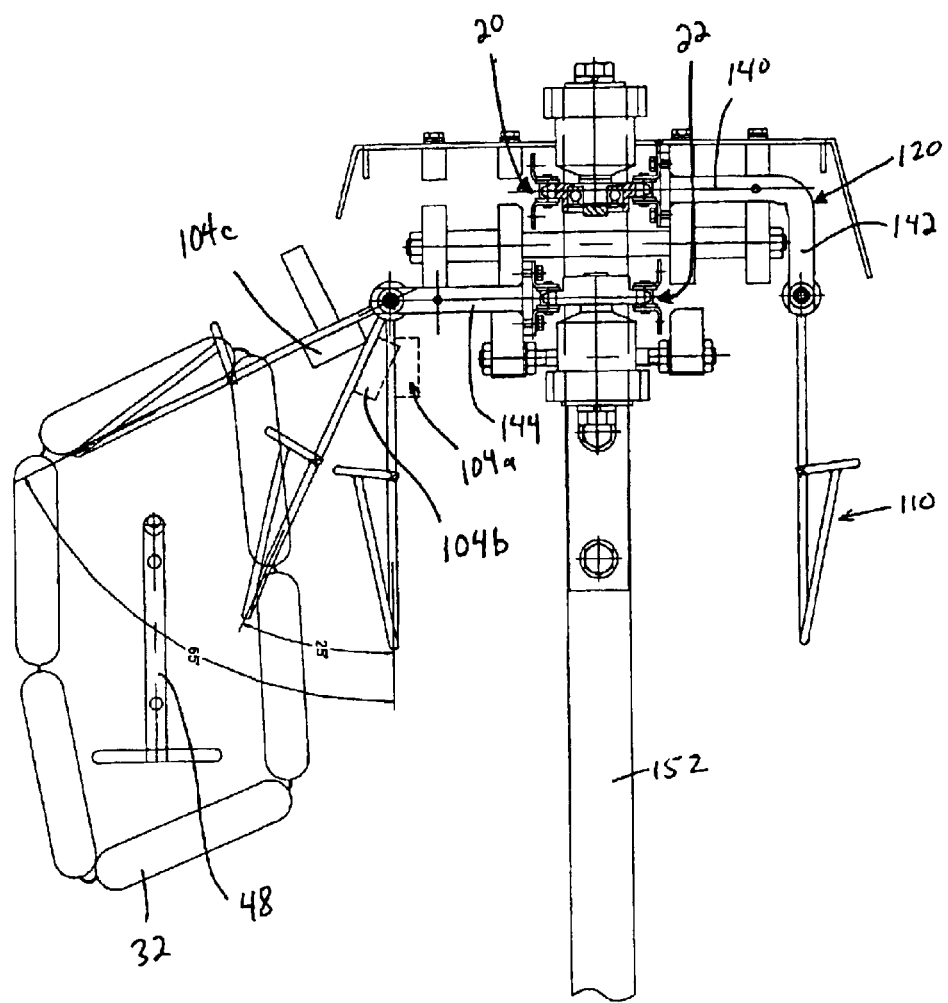
FIG. 11 is an end side elevational view taken along line 11—11 of FIG. 9 illustrating the orientation of the link support members and the linked food product thereon at the unloading process.
Figure 14B:
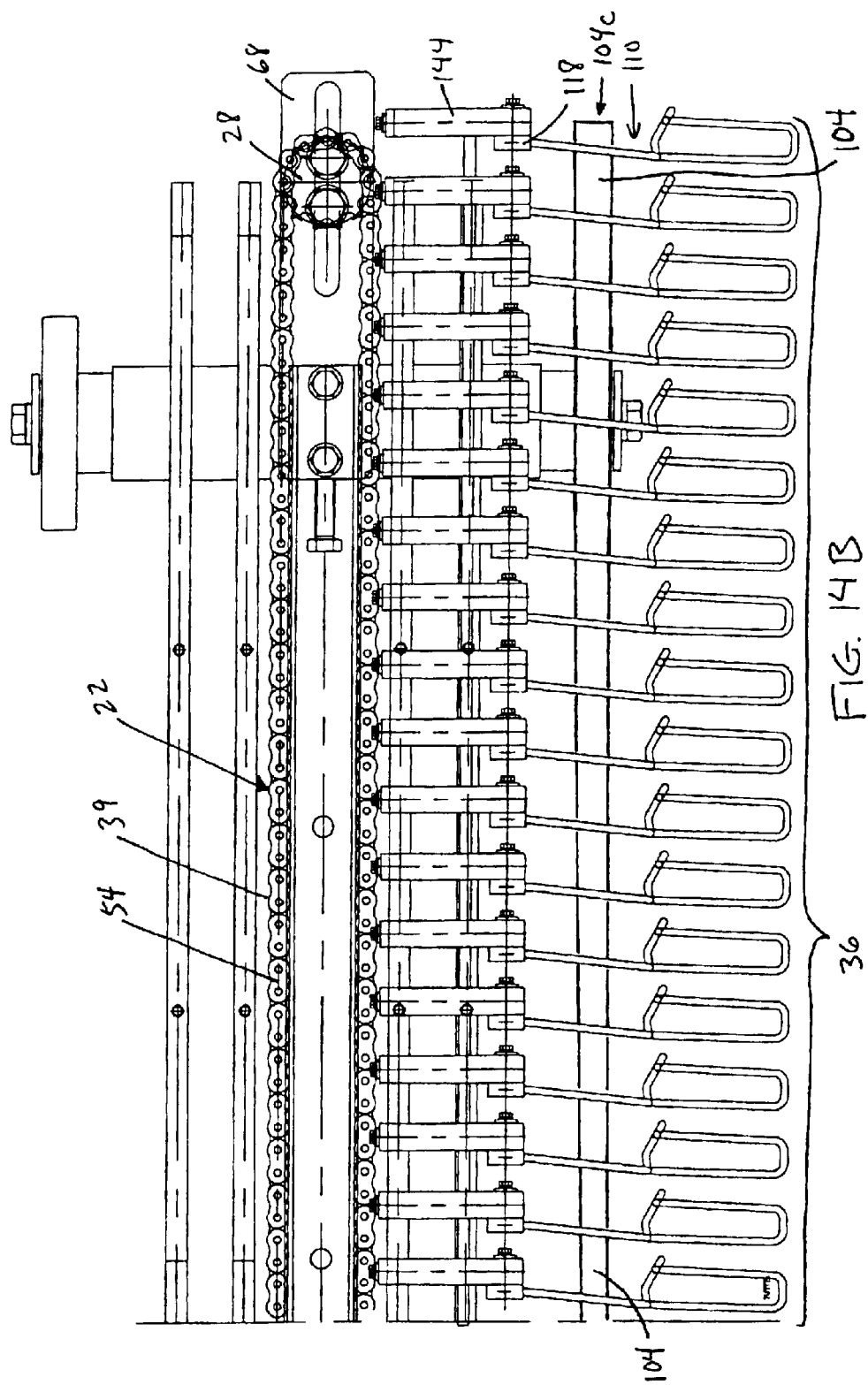

One embodiment of the unloading member 104 is illustrated in the views of FIG. 11 and FIG. 14B. For example, the unloading member 104 is an elongated bar extending about the length of the unloading station 14. Initially, the unloading member 104 bends outward slightly and then runs alongside the conveyors but laterally displaced. Thus, as a given set of link support members is conveyed toward the unloading station 14, each link support member 110 engages the outwardly extending unloading member 104 (the loading station end of which is illustrated in position 104a in FIG. 11), which through mechanical engagement and the link support members 110 being pivotally coupled to the conveyor, the link support members 110 pivot laterally outward (an intermediate position illustrated as 104b in FIG. 11) until all of the link support members 110 of the given set are in an unloading position (shown as 104c in FIG. 11 and in FIG. 14B). Thus, the unloading member 104 extends from position 104a to 104c and remains at position 104c through the unloading station 14. It is noted that the unloading member 104 may include more than one bar in order to accomplish the transition from position 104a to position 104c.

In an alternative embodiment, the unloading member 104, extends across the unloading station 14 in position 104a of FIG. 11, and through an appropriate actuation (e.g., a pneumatic cylinder), is caused to move laterally outward (e.g., moving to position 104b and finally to position 104c) such that the entire set of link support members are pivoted to an unloading position (see also FIG. 14B). However, it is noted that an unloading member 104 is not required in all embodiments in order to unload a linked chain.

As the link supports members 110 of set 36 pivot laterally outward, a lower portion (e.g., a U-shaped section 114 as described below) of the link support member 110 functions to "open-up" the looped chain 32, while at the same time the stick 48 or other holding device is inserted into the looped chain having been opened (illustrated in FIG. 11). The lateral outward pivot of the set 36 of link support members 110 can be seen in the right side of FIG. 9 and more clearly in the enlarged view of FIG. 13B (e.g., the link support members 110 appear shorter) and in FIG. 10 and more clearly in the enlarged view of FIG. 14B (e.g., the link support members 110 are visible in the plan view). In preferred form, in the unloading position, the link support members 110 are pivoted outward at about 65 degrees relative to a vertical axis; however, such pivot angle may vary depending on the specific implementation.

In operation, once the entire set 36 of link support members 110 is pivoted outward, the conveyor 22 is stopped and the stick 48 is lifted vertically upward; thus, lifting the looped food product off of the link support members 110. The loaded stick 48 is then moved, carried or rotated away to insert the looped and linked chain of food product into a separate food processing station (or moved into position to be received by a food processing station) to be cooked or otherwise processed. The movement of the conveyor 22 is then resumed such that as the link support members 110 begin to round the corner at the end sprocket 28, the unloading member 104 is shaped to cause the link support members 110 to pivot back to their normal vertically disposed orientation. Alternatively, the unloading member 104 caused to retract back to the initial position (e.g., position 104a), then the conveyor movement is continued. The set 36 of link support members then "races" around the conveyor track and returns to the loading station 12 to load another linked chain 32.

Alternatively, once the set 36 of link support members is pivoted outward and the stick 48 is inserted into the opened loop, the conveyor 22 is stopped and the link support members 110 are caused to pivot inwardly back to the their normal vertically disposed orientation relative to the stick, which is held vertically stationary (or alternatively lifted upward as the link support members 110 drop). Thus, the downward motion of the link support members 110 relative to the stationary stick 48 or upward movement of the stick causes the stick 48 to "lift" the loops off of the descending link support members. The stick, which is now loaded with the looped and linked chain of food product, is then moved into the separate food processing station or into position to be received by a food processing station. It is noted that the stick insertion and other stick 48 motions (e.g., lifting, moving to the separate processing station) may be automatically performed by a robot (e.g., and controlled in part by controller 53) or manually performing by an operator. In this alternative form, the unloading member 104 that caused the link support members 110 of a given set 34, 36 to pivot outward is made to retract or move downward; thus, causing the link support members to pivot back inwardly. The unloading member 104 and the link support members 110 retract either through the shape of the member 104 bending back to the position 104a or through an actuating device that causes the unloading member 104 and the link support members 110 to drop to position 104a. Again, once unloaded, the movement of the conveyor 22 is then resumed and the set 36 of link support members then "races" around the conveyor track and returns to the loading station 14 to load another linked chain of food product.

Figure 12:
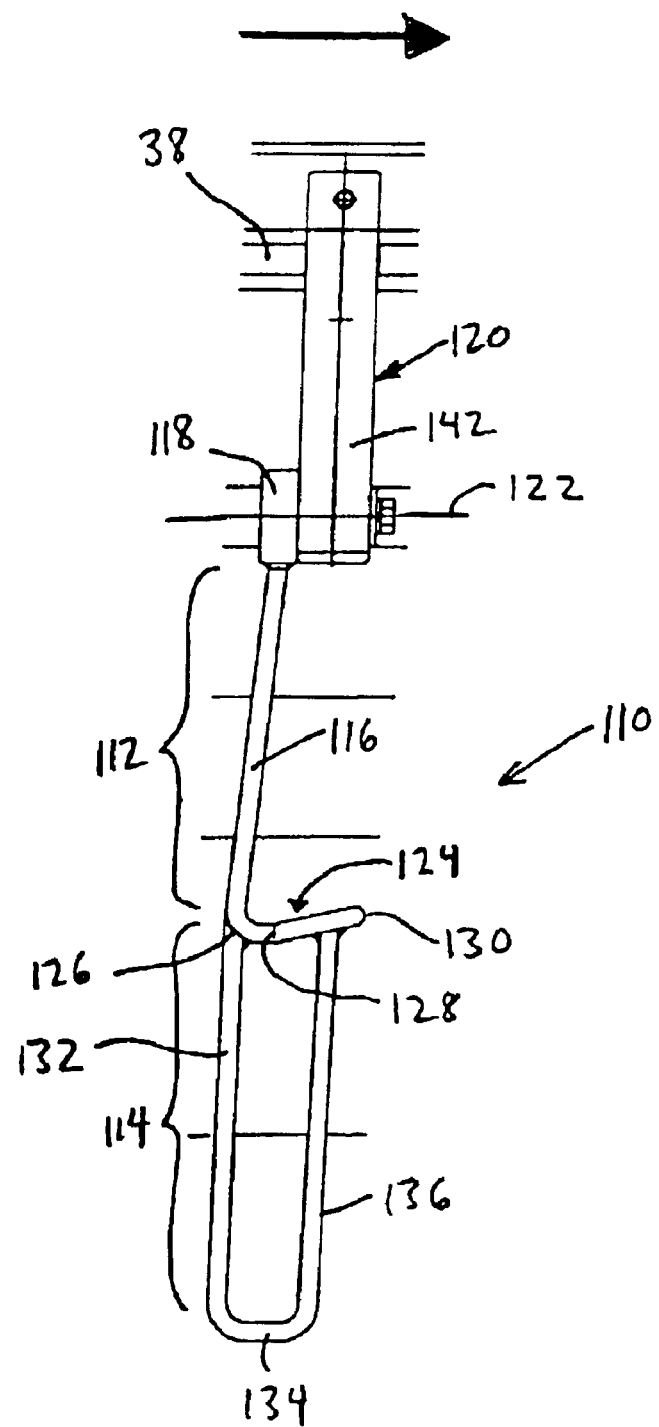
FIG. 12 is a side view of the preferred link support member of FIGS. 9–14B.

A preferred link support member 110 of the conveyor system 100 of FIGS. 8–14B is illustrated in the side elevational view of FIG. 12. The link support member 110 includes a link support section 112 and a U-shaped lower section 114. The link support section 112 includes a downwardly extending section 116 extending vertically from an upper end to a lower end. The upper end is attached to a movable support 118, which is pivotally attached to the bracket 120. Bracket 120 is rigidly fixed to one of the links of the respective conveyor chain. Thus, support 118 rotates to allow the link support member 110 to pivot laterally outward, i.e., the link support member 110 pivots about an axis 122 which is parallel to the direction of movement of the conveyor chain. The downwardly extending section 116 extends downward at a rearward angle. In the illustrated embodiment, the downwardly extending section is oriented at an angle of between 0 and 10 degrees to vertical. At its lower end is the holding portion 124. The holding portion 124 comprises a first segment that extends forward and inward at a first angle from an inner end 126, and a second segment beginning at point 128 that extends at a second angle laterally outward and upward to an outer end 130.

The U-shaped section 114 includes a leg 132 which is contiguous with the downwardly extending section 112 and extends from the inner end 126 of the holding portion 124 vertically downward a distance approximately equal to the length of the downwardly extending section 112. At its lower end, the leg 132 bends into a bottom leg 134 of the U-shaped section 114, which extends in the horizontal plane in the direction of the movement of the conveyor and at an angle laterally outward from the conveyor. The bottom leg 134 then bends upward into another leg 136 of the U-shaped section 114. Leg 136 extends substantially vertically and meets with the holding portion 124 proximate to its end 130. As illustrated, the U-shaped section 114 resembles an elongated letter "U", the top ends extending from the inner end 126 at the downwardly extending section 116 to proximate the end 130 of the holding portion 124.

The specific configuration of the link support member 110 adds to the efficient design of the conveyor system 100 and is especially useful in the automated unloading of linked chain 32. That is, the unloading may be efficiently performed by pivoting the link support members 110 laterally outward for stick insertion, then lifting the stick 48 and the links of food product off of the link support member 110. Alternatively, after being pivoted outward, the link support members 110 may be pivoted back to their normal orientation in a vertical plane while the stick 48 is maintained at a fixed vertical position or alternatively moved vertically upward such that the stick "lifts" the food product off of the set of link support members. In either case, the orientation of the holding portion 124 allows for adequate hanging functionality while facilitating removal by not interfering with removal of the linked food product. That is, the holding portion 124 does not resist lifting of the linked food product from the link support member 110.

Additionally, the elongated U-shaped section 114 of each link support member 110 functions to lift the outer links of the chain of food product links as the link support member 110 pivots laterally outward in order to "open up" the loop for stick insertion. That is, the bottom leg 134 of the U-shaped section 114 engages the outer links to open the loop, as shown in FIG. 11. Additionally, the legs 132 and 136 act to guide the linked product so that it will not roll or fall off of the bottom 134 in the raised or "open" position of FIG. 11. The holding portion 124 is designed such that the links are carried on a linear segment of the holding portion 124 between the inner end 126 and bend 128.

Figure 13B:
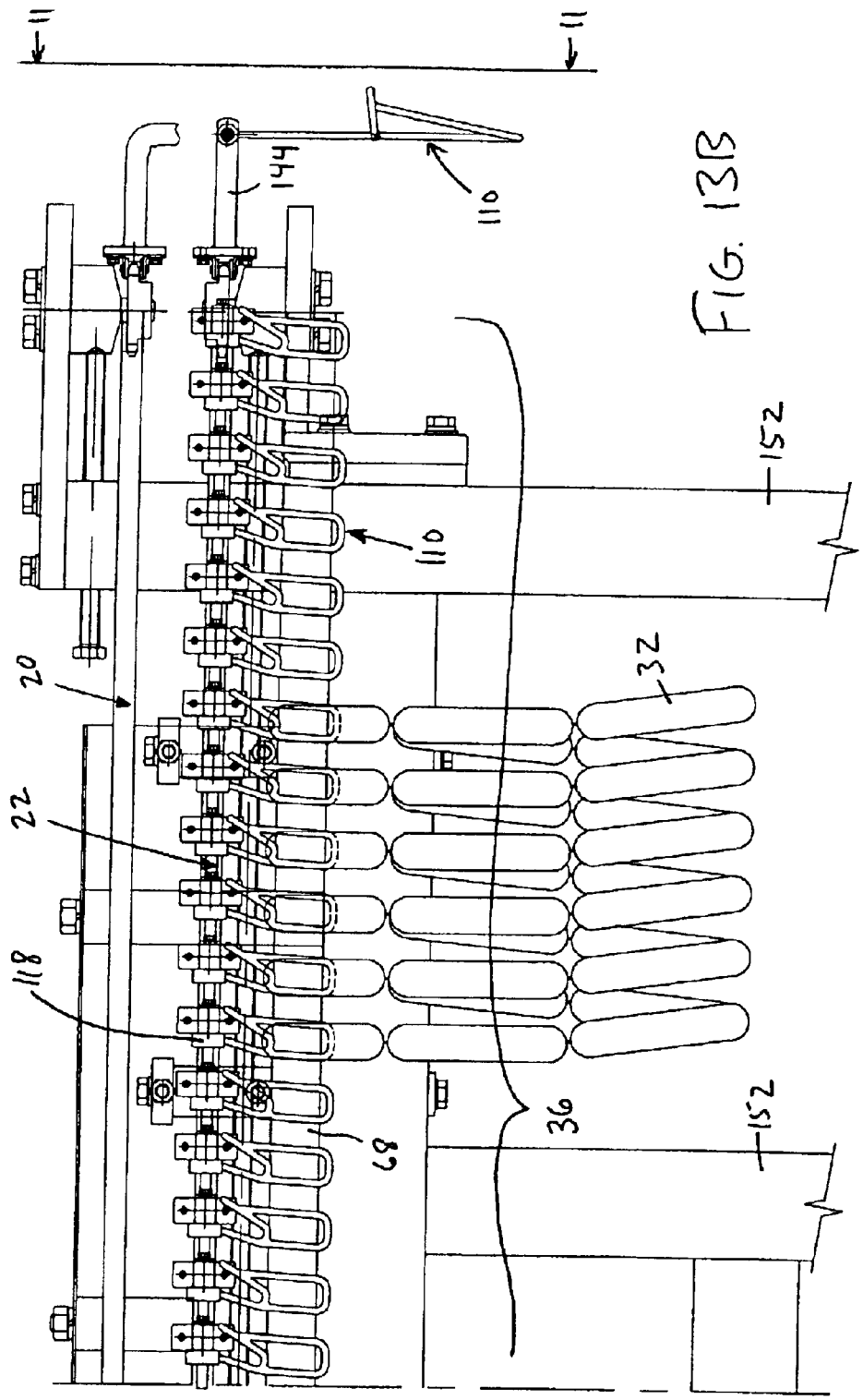

Various views of the preferred link support member are illustrated in FIGS. 13A–14B. For example, FIGS. 13B and 14B illustrate the link support members 110 pivoted laterally outward at approximately 65 degrees for unloading. FIGS. 13A and 14A illustrate the link support members 110 pivoted laterally outward at about 25 degrees for loading. It is noted that in FIG. 14A, a top view is shown of many of the link supports of set 34 in their normally vertically disposed orientation; thus, illustrating the orientation of the holding portion 124.

Again, as with the conveyor system 10 of FIGS. 1–5, since the linker 16 can load one set 34 of link support members while another set of link support members is simultaneously being unloaded, the unloading time is eliminated from the production cycle at the linker. Thus, in some embodiments, the allowable time for unloading can also be increased, in comparison to a single conveyor system with a single set of link supports, which must wait for the completion of unloading to produce the next linked chain. Additionally, the allowable unloading time is also increased in comparison to a single conveyor system having multiple sets of link supports or continuous link supports in which operation of the linker and loading operation is interrupted by conveyor stoppages during the unloading operation.

Thus, in preferred embodiments, the allowable unloading time increase allows the unloading process may be automated. The design of the unloading mechanism is such that the unloading member 104 opens the linked chain for unloading. Once opened, the conveyor typically stops and the stick 48 is inserted by a robot or other automated structure into the opened chain (or alternatively, the opened chain is conveyed about the stationary stick). At this point, either through raising the stick 48 and/or lowering the link support members 110, the linked chain is lifted off of the link support members. Again, due to the design of the link support members 110, resistance to such vertical lifting motion is minimized, while at the same time the link support member is designed to adequately hold the linked chain and minimize the likelihood that the links will fall out of the link support members 110. Again, the robot or other automated structure then transfers the loaded stick into a processing oven as is known in the art.

It is also noted that as described above, although the unloading time may be increased, in some embodiments, the unloading time is minimized, which will minimize the time length of conveyor stoppages. Minimizing the time length of conveyor stoppages leads to minimizing the separation or gap 84 that is to be maintained to avoid colliding sets of link support members, which will allow the linker to operate more continuously. Additionally, as described above, the gap 84 is to be minimized between the end of loading a given set of link support members and the beginning of loading the next linked chain onto the next set of link support members at the loading station 12. Thus, in such embodiments, the time duration of loading a given linked chain 32 onto a given set of link support members is at least as long as the time duration to convey a given linked chain 32 to the unloading station 14, unload the linked chain and then convey the set of link support members back into position to receive the next linked chain 32 at the loading station 12. This will ensure that a set of link support members is in position to receive the next linked chain from the linker 16 as soon as the linker 16 is able to produce another linked chain; therefore, providing near continuous linker operation.

Also illustrated in FIG. 12 as well as the enlarged views of FIGS. 13A and 14A is the bracket 120 that couples the link support member 110 to the upper conveyor 20. In the conveyor system of FIGS. 8–14B, the link support members 110 are all designed the same. That is, the downwardly extending sections 116 of the link support members 110 coupled to both the upper conveyor 20 and the lower conveyor 22 are the same length. However, in order that the holding portions 124 remain at the same elevation to best cooperate with the linker at the loading station 12 and the stick insertion technique at the unloading station 14 (which is preferably automated), bracket 120 couples to the upper conveyor 20 at its upper end and couples to the link support member 110 at its lower end. For example, bracket 120 includes two legs 140, 142. Leg 140 is affixed to the conveyor chain at one end and extends horizontally outward from the conveyor chain a specified distance, then bends approximately 90 degrees into leg 142 which extends generally vertically downward such that the support 118 is rotatably received into a lower end of leg 142. The length of leg 142 accounts for the difference in elevation between the upper and lower conveyors 20, 22.

In comparison, as can be seen in FIGS. 13B and 14B, the link support members 110 of set 36 are coupled to the lower conveyor 22 with bracket 144. Bracket 144 is affixed to the lower conveyor chain 39 at one end and extends horizontally outward from the chain such that it receives support 118 at its outer end. It is noted that bracket 144 extends horizontally outward approximately the same distance as leg 140 of bracket 120. Thus, the brackets 120 and 140 allow the link support members 110 to be vertically positioned at the same elevation, i.e., a different link support member is not required for the upper and lower conveyors 20, 22 as is illustrated in the conveyor system 10 of FIGS. 2–5.

While the invention herein disclosed has been described by means of specific embodiments and applications thereof, numerous modifications and variations could be made thereto by those skilled in the art without departing from the scope of the invention set forth in the claims.

What is claimed is:

1. A system for conveying chains of linked food products comprising:
   a first conveyor having a first path of motion from a loading station proximate a linker to an unloading station and back to the loading station;
   a first set of link support members coupled to the first conveyor, the link support members configured to receive and suspend therefrom a first chain of linked food product discharged from the linker at the loading station and to convey the first chain to the unloading station;
   a second conveyor having a second path of motion from the loading station to the unloading station and back to the loading station; and
   a second set of link support members coupled to the second conveyor, the link support members configured to receive and suspend therefrom a second chain of linked food product discharged from the linker at the loading station and to convey the second chain to the unloading station;
   wherein the loading station and the unloading station are shared between the first conveyor and the second conveyor;
   wherein receiving the second chain at the second set of link support members is not effected by an interruption in movement of the first conveyor.

2. The system of claim 1 wherein the receiving the second chain at the second set of link support members is not affected by an unloading of the first chain from the first set of link support members at the unloading station, such that the operation of the linker is not limited by the unloading of the first chain whereby improving the efficiency of the linker.

3. The system of claim 1 wherein the second conveyor is configured to move while the motion of the first conveyor is interrupted.

4. The system of claim 1 wherein at the unloading station, the first chain is unloaded from the first set of link support members, wherein the unloading of the first chain is not affected by an interruption in movement of the second conveyor.

5. The system of claim 1 wherein the first conveyor and the second conveyor are independently driven.

6. A system for conveying chains of linked food products comprising:
   a first conveyor having a first path of motion from a loading station proximate a linker to an unloading station and back to the loading station;
   a first set of link support members coupled to the first conveyor for receiving a first chain of linked food product discharged from the linker at the loading station and conveying the first chain to the unloading station;
   a second conveyor having a second path of motion from the loading station to the unloading station and back to the loading station; and
   a second set of link support members coupled to the second conveyor for receiving a second chain of linked food product discharged from the linker at the loading station and conveying the second chain to the unloading station;
   wherein the loading station and the unloading station are shared between the first conveyor and the second conveyor;
   wherein the receiving the second chain at the second set of link support members is not affected by an interruption in movement of the first conveyor;
   wherein the first conveyor is vertically displaced at a different elevation than the second conveyor.

7. The system of claim 1 wherein a holding portion of each of the first set of link support members is at a same elevation as a holding portion of each the second set of link support members.

8. A The system for conveying chains of linked food products comprising:
   a first conveyor having a first path of motion from a loading station proximate a linker to an unloading station and back to the loading station;
   a first set of link support members coupled to the first conveyor for receiving a first chain of linked food product discharged from the linker at the loading station and conveying the first chain to the unloading station;
   a second conveyor having a second path of motion from the loading station to the unloading station and back to the loading station; and
   a second set of link support members coupled to the second conveyor for receiving a second chain of linked food product discharged from the linker at the loading station and conveying the second chain to the unloading station;
   wherein the loading station and the unloading station are shared between the first conveyor and the second conveyor;
   wherein the receiving the second chain at the second set of link support members is not affected by an interruption in movement of the first conveyor;
   wherein each link support member comprises:
   a downwardly extending section coupled at its upper end to a respective one of the first conveyor and the second conveyor; and
   a holding portion coupled to the downwardly extending section, at least a portion of the holding portion extending upward and forward.

9. The system of claim 1 further comprising a stick positioned at the unloading station to be received into respective loops of a respective chain of the linked food product suspended from a respective set of link support members.

10. The system of claim 1 further comprising a gap between the first set of link support members and the second set of link support members to prevent collisions between the first set of link support members and the second set of link support members.

11. The system of claim 10 wherein the gap is minimized at the loading station in order to provide near continuous linker operation.

12. A system for conveying chains of linked food products comprising:

a first conveyor having a first path of motion from a loading station proximate a linker to an unloading station and back to the loading station;

a first set of link support members coupled to the first conveyor, the link support members configured to receive and suspend therefrom a first chain of linked food product discharged from the linker at the loading station and to convey the first chain to the unloading station, the unloading station for unloading the first chain from the first set of link support members;

a second conveyor having a second path of motion from the loading station to the unloading station and back to the loading station; and a second set of link support members coupled to the second conveyor, the link support members configured to receive and suspend therefrom a second chain of linked food product discharged from the linker at the loading station and to convey the second chain to the unloading station, the unloading station for unloading the second chain from the second set of link support members;

wherein the loading station and the unloading station are shared between the first conveyor and the second conveyor;

wherein unloading the first chain from the first set of link support members is not affected by an interruption in movement of the second conveyor.

13. The system of claim 12 wherein the unloading the first chain from the first set of link support members is not affected by the receiving and the conveying of the second chain such that efficiency at the unloading station is improved.

14. The system of claim 12 wherein the first conveyor is configured to move while the motion of the second conveyor is interrupted.

15. The system of claim 12 wherein the first conveyor is configured to move while the motion of the second conveyor is moving.

16. The system of claim 12 wherein the first conveyor and the second conveyor are independently driven.

17. A method of conveying chains of linked food products comprising:

receiving a first chain of linked food product discharged from a linker at a loading station onto a first set of link support members of a first moving conveyor such that the first chain is suspended from the first set of link support members;

conveying the first chain to an unloading station with the first moving conveyor;

unloading the first chain from the first set of link support members of the first moving conveyor at an unloading station; and receiving a second chain of linked food product discharged from the linker at a loading station onto a second set of link support members of a second moving conveyor such that the second chain is suspended from the second set of link support members;

wherein the loading station and the unloading station are shared between the first moving conveyor and the second moving conveyor;

wherein the receiving the second chain is not affected by an interruption in movement of the second moving conveyor.

18. The method of claim 17 wherein the receiving the second chain is not affected by the unloading step such that the operation of the linker is not limited by the unloading of the first chain whereby improving the efficiency of the linker.

19. The method of claim 17 wherein the receiving the second chain step is continuously performed during an interruption of conveyor movement in the unloading step.

20. The method of claim 17 wherein the first moving conveyor and the second moving conveyor are independently driven.

21. A method of conveying chains of linked food products comprising:

receiving a first chain of linked food product discharged from a linker at a loading station onto a first set of link support members of a first moving conveyor such that the first chain is suspended from the first set of link support members;

conveying the first chain to an unloading station with the first moving conveyor;

unloading the first chain from the first set of link support members of the first moving conveyor at an unloading station; and receiving a second chain of linked food product discharged from the linker at a loading station onto a second set of link support members of a second moving conveyor such that the second chain in suspended from the second set of link support members;

conveying the second chain to the unloading station with the second moving conveyor wherein the loading station and the unloading station are shared between the first moving conveyor and the second moving conveyor;

wherein the unloading the first chain from the first set of link support members step is not affected by an interruption in movement of the second conveyor.

22. The method of claim 21 wherein the unloading the first chain step is not affected by the receiving and the conveying of the second chain such that efficiency at the unloading station is improved.

23. The method of claim 21 wherein the unloading the first chain step is continuously performed during an interruption of conveyor movement in the receiving and conveying the second chain steps.

* * * * *